US011453261B2

(12) United States Patent
Marmara et al.

(10) Patent No.: US 11,453,261 B2
(45) Date of Patent: Sep. 27, 2022

(54) TRAILER TO VEHICLE INTEGRAL CURRENT DRAW MANAGEMENT

(71) Applicant: GM GLOBAL TECHNOLOGY OPERATIONS LLC, Detroit, MI (US)

(72) Inventors: Stacey M. Marmara, Markham (CA); Todd J. Brinkman, Rochester Hills, MI (US); David B. Antanaitis, Northville, MI (US); Steven Reini, Waterford, MI (US); Douglas J. Spry, Auburn Hills, MI (US); Brandon E. Pieniozek, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 12 days.

(21) Appl. No.: 17/106,952

(22) Filed: Nov. 30, 2020

(65) Prior Publication Data
US 2022/0169085 A1 Jun. 2, 2022

(51) Int. Cl.
| | |
|---|---|
| *B60D 1/62* | (2006.01) |
| *B60T 8/17* | (2006.01) |
| *B60R 16/033* | (2006.01) |
| *B60T 13/74* | (2006.01) |
| *H02J 7/00* | (2006.01) |

(52) U.S. Cl.
CPC ............. *B60D 1/62* (2013.01); *B60R 16/033* (2013.01); *B60T 13/74* (2013.01); *H02J 7/0048* (2020.01); *H02J 7/0063* (2013.01); *B60T 8/17* (2013.01); *B60T 2250/00* (2013.01)

(58) Field of Classification Search
CPC ........ B60D 1/62; H02J 7/0048; H02J 7/0063; B60R 16/033; B60T 13/74; B60T 8/17; B60T 2250/00
USPC .................................................. 307/10.1, 9.1
See application file for complete search history.

(56) References Cited

U.S. PATENT DOCUMENTS

| | | | | |
|---|---|---|---|---|
| 2018/0138716 | A1* | 5/2018 | Bailey | H02J 4/00 |
| 2019/0217831 | A1* | 7/2019 | Viele | B60T 8/1708 |
| 2019/0233034 | A1* | 8/2019 | Viele | B60D 1/36 |
| 2019/0299944 | A1* | 10/2019 | Nilsson | B60W 20/14 |
| 2020/0282930 | A1* | 9/2020 | Floris | H02J 9/061 |

FOREIGN PATENT DOCUMENTS

WO WO-2016000730 A1 * 1/2016 ............ B60T 13/662

* cited by examiner

*Primary Examiner* — Michael R. Fin
(74) *Attorney, Agent, or Firm* — Lorenz & Kopf LLP

(57) ABSTRACT

In accordance with an exemplary embodiment, an autonomous system is provided that includes: a tow vehicle, a trailer, and a control system. The tow vehicle has a vehicle battery. The trailer is coupled to the tow vehicle, and has a trailer battery. The control system includes a sensor and a processor. The sensor is configured to at least facilitate measuring a state of charge of the trailer battery. The processor is coupled to the sensor, and is configured to at least facilitate selectively providing current from the tow vehicle to the trailer based on the state of charge of the trailer battery.

13 Claims, 2 Drawing Sheets

TRAILER TO VEHICLE INTEGRAL CURRENT DRAW MANAGEMENT

TECHNICAL FIELD

The present disclosure generally relates to vehicles, and more particularly relates to management of current between a tow vehicle and a trailer.

BACKGROUND

Various vehicles may serve as tow vehicles for towing a trailer. The tow vehicle may provide current for trailer operation in various instances. However, in certain embodiments, the providing of current from the tow vehicle to the trailer may not always be optimal, and for example may exceed the tow vehicle's circuit capacity in certain situations.

Accordingly, it is desirable to provide improved techniques for providing current between tow vehicles and trailers. It is also desirable to provide methods and systems utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for controlling automatic current from a tow vehicle to a trailer coupled thereto, the tow vehicle having a vehicle battery and the trailer having a trailer battery, the method including: measuring, via a sensor, a state of charge of the trailer battery; and selectively providing current from the tow vehicle to the trailer based on the state of charge of the trailer battery, in accordance with instructions provided by the processor.

Also in an exemplary embodiment, the method further includes measuring, via a second sensor, a state of charge of the vehicle battery; wherein the step of selectively providing current includes selectively providing current from the tow vehicle to the trailer based on both the state of charge of the trailer battery and the state of charge of the vehicle battery, in accordance with the instructions provided by the processor.

Also in an exemplary embodiment, the method further includes: determining whether a braking event is occurring; and determining whether the state of charge of the trailer battery is less than a predetermined threshold; wherein the step of selectively providing current includes selectively providing current from the tow vehicle to the trailer to control braking, based on whether the braking event is occurring and the state of charge of the trailer is less than the predetermined threshold.

Also in an exemplary embodiment, the method further includes: providing current from the vehicle battery to a braking system of the trailer to perform braking for the trailer, when the braking event is occurring and the state of charge of the trailer battery is less than the predetermined threshold; and providing current from the trailer battery, instead of the vehicle, to the braking system of the trailer to perform braking for the trailer, when the braking event is occurring and the state of charge of the trailer battery is greater than the predetermined threshold.

Also in an exemplary embodiment, the step of selectively providing current further includes: providing current from the vehicle battery to charge the trailer battery, when the braking event is not occurring; and isolating the vehicle battery from the trailer battery, so that the vehicle battery in not charging the trailer battery, when the braking event is occurring.

Also in an exemplary embodiment, the step of selectively providing current further includes operating a braking system of the trailer in a degraded mode, with limited current, when the state of charge of the trailer battery is less than the predetermined threshold.

Also in an exemplary embodiment, wherein the step of selectively providing current further includes operating one or more additional system of the trailer, in addition to the braking system of the trailer in a degraded mode, with limited current, when the state of charge of the trailer battery is less than the predetermined threshold.

In another exemplary embodiment, a system is provided for controlling automatic current from a tow vehicle to a trailer coupled thereto, the tow vehicle having a vehicle battery and the trailer having a trailer battery, the system including: a sensor configured to at least facilitate measuring a state of charge of the trailer battery; and a processor coupled to the sensor and configured to at least facilitate selectively providing current from the tow vehicle to the trailer based on the state of charge of the trailer battery.

Also in an exemplary embodiment, the system further includes a second sensor configured to at least facilitate measuring a state of charge of the vehicle battery; wherein the processor is configured to at least facilitate selectively providing current from the tow vehicle to the trailer based on both the state of charge of the trailer battery and the state of charge of the vehicle battery.

Also in an exemplary embodiment, the processor is configured to at least facilitate: determining whether a braking event is occurring; determining whether the state of charge of the trailer battery is less than a predetermined threshold; and selectively providing current from the tow vehicle to the trailer to control braking, based on whether the braking event is occurring and the state of charge of the trailer is less than the predetermined threshold.

Also in an exemplary embodiment, the processor is configured to at least facilitate: providing current from the vehicle battery to a braking system of the trailer to perform braking for the trailer, when the braking event is occurring and the state of charge of the trailer battery is less than the predetermined threshold; and providing current from the trailer battery, instead of the vehicle, to the braking system of the trailer to perform braking for the trailer, when the braking event is occurring and the state of charge of the trailer battery is greater than the predetermined threshold.

Also in an exemplary embodiment, the processor is configured to at least facilitate: providing current from the vehicle battery to charge the trailer battery, when the braking event is not occurring; and isolating the vehicle battery from the trailer battery, so that the vehicle battery is not charging the trailer battery, when the braking event is occurring.

Also in an exemplary embodiment, the processor is configured to at least facilitate operating a braking system of the trailer in a degraded mode, with limited current, when the state of charge of the trailer battery is less than the predetermined threshold.

Also in an exemplary embodiment, the processor is configured to at least facilitate operating one or more additional system of the trailer, in addition to the braking system of the trailer in a degraded mode, with limited current, when the state of charge of the trailer battery is less than the predetermined threshold.

In a further exemplary embodiment, an autonomous system is provided that includes: a tow vehicle, a trailer, and a control system. The tow vehicle has a vehicle battery. The trailer is coupled to the tow vehicle, and has a trailer battery. The control system includes a sensor and a processor. The sensor is configured to at least facilitate measuring a state of charge of the trailer battery. The processor is coupled to the sensor, and is configured to at least facilitate selectively providing current from the tow vehicle to the trailer based on the state of charge of the trailer battery.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
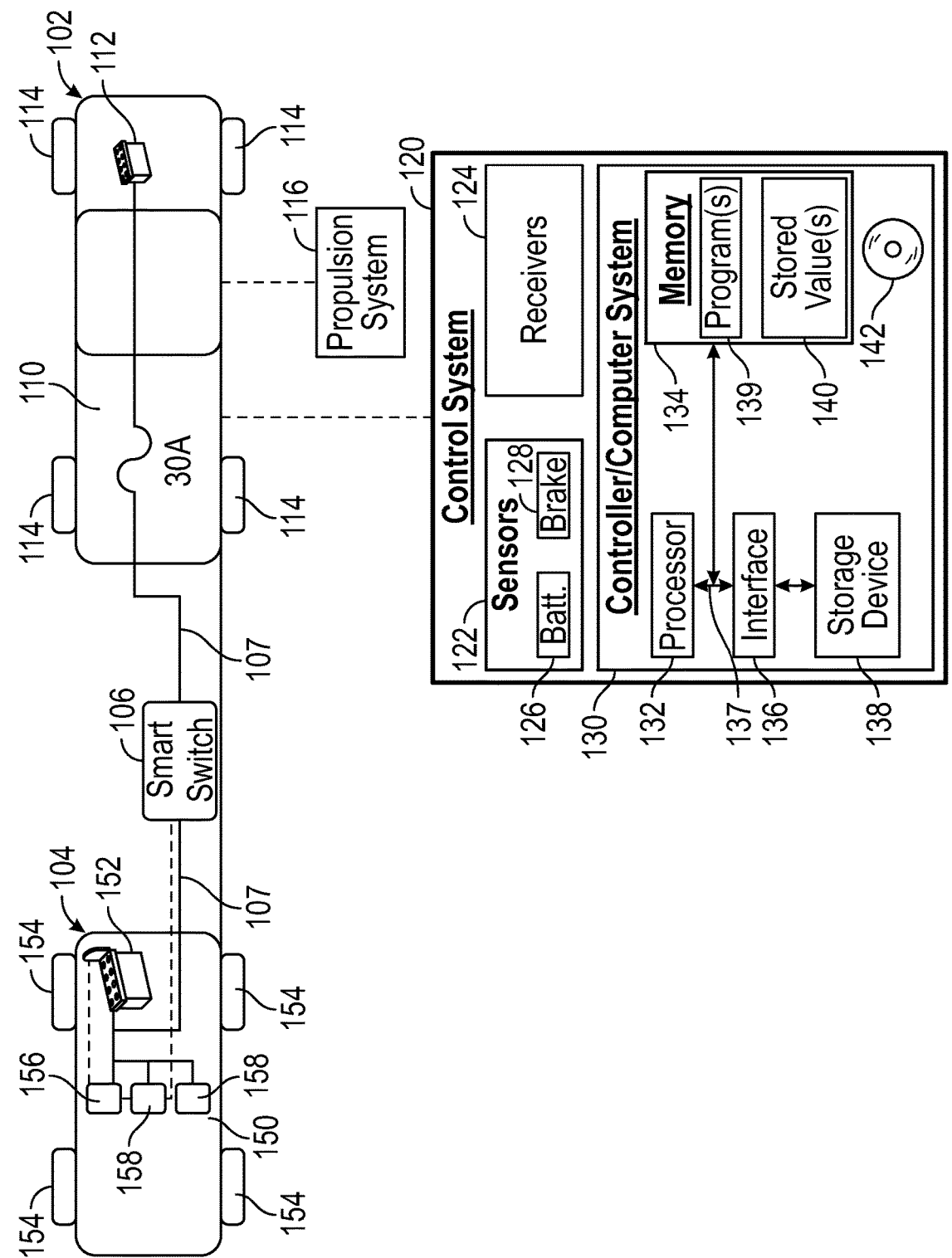
FIG. 1 is a functional block diagram of a system that includes a vehicle and a trailer, with controlled current flow between the vehicle and the trailer, in accordance with an exemplary embodiment.
Figure 2:
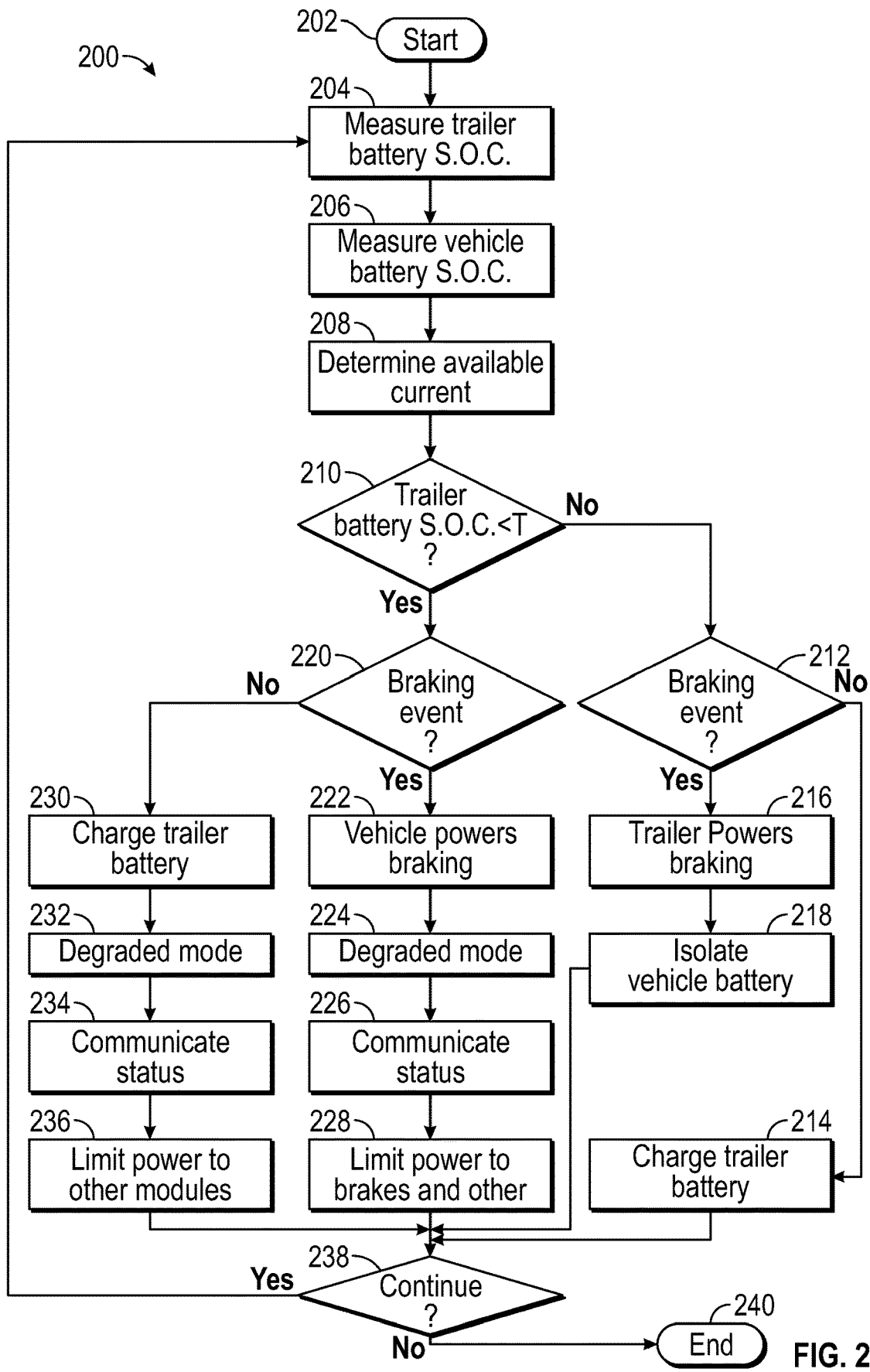
FIG. 2 is a flowchart of a process for controlling current flow between a vehicle and a trailer, such as the vehicle and the trailer of FIG. 1, in accordance with an exemplary embodiment.

FIG. 1 illustrates an automotive system (or "system") 100 that includes a vehicle 102 (also referred to as tow vehicle 102) and a trailer 104. As depicted in FIG. 2, the vehicle 102 and the trailer 104 are connected together via a smart switch 106 and one or more connectors 107, so that the trailer 104 moves along with the vehicle 102 as the vehicle 102 is driven. As described in greater below, the system 100 includes a control system 120 that controls current flow between the vehicle 102 and the trailer 104. In various embodiments, the control system 120 is part of the vehicle 102 and/or the trailer 104.

It will be appreciated that the vehicle 102 and trailer 104 may comprise any one or more of a number of different types of vehicles and trailers, respectively. For example, the vehicle 102 may be any one of a number of different types of automobiles and/or other vehicle types. For example, in various embodiments, the vehicle 102 may comprise a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or any one of a number of other types of vehicles. Similarly, the trailer 104 may be any one of a number of different types of trailers pulled and/or transported by such a vehicle 102, including, by way of example only, trailers used to transport other automobiles, boats or other marine vehicles, other vehicles, cargo, and/or other devices and/or systems.

As depicted in FIG. 1, the vehicle 102 includes, in addition to the above-referenced control system 120, a body 110, a battery 112, four wheels 114, and a propulsion system 116. The body 110 substantially encloses the other components of the vehicle 102.

The battery 112 provides electric current for the vehicle 102, including for braking and other vehicle components. In addition, in various situations, the battery 112 also provides current for the trailer 104, including for charging a battery 152 of the trailer 104, for braking for the trailer 104, and for other trailer components.

In the depicted embodiment, the wheels 114 are each disposed near a respective corner of the body 110. In various embodiments the vehicle 102 may differ from that depicted in FIG. 1. For example, in certain embodiments the number of wheels 114 may vary.

The propulsion system 116 powers the vehicle 102 via movement of the wheels 114. In various embodiments, the propulsion system 116 is part of an actuator assembly for powering movement of the vehicle. In one embodiment, the propulsion system 116 comprises one or more motors and/or engines, and drives the wheels 114.

Also as depicted in FIG. 1, in various embodiments, the trailer 104 includes a body 150, a battery 152, four wheels 154, and a braking system 156. In various embodiments, the body 150 substantially encloses the other components of the trailer 104. Also in various embodiments, the trailer 104 includes one or more other systems 158 (such as, by way of example, a lighting system, an environment control system, trailer hydraulic actuators, leveling jacks, and so on).

The battery 152 provides electric current for the trailer 104, including for braking and other vehicle components.

In the depicted embodiment, the wheels 154 are each disposed near a respective corner of the body 150. In various embodiments, the number of wheels 154 may vary.

Also in various embodiments, the braking system 156 controls braking of the trailer 104. In various embodiments, the braking system 156 controls braking of the trailer 104 in accordance with instructions provided via the smart switch 106 and/or processor 132.

As noted above, the control system 120 controls electric current between the vehicle 102 and the trailer 104, for example as described in greater detail further below in connection with the process 200 of FIG. 2. In various embodiments, the control system 120 may be disposed, in whole or in part, on the vehicle 102, on the trailer 104, and/or on the smart switch 106 of FIG. 1.

In various embodiments, as depicted in FIG. 1, the control system 120 comprises a sensor array 122, one or more transceivers 124, and a controller 130.

In various embodiments, the sensor array 122 includes sensors that measure and/or obtain information pertaining to one or more devices, systems, and/or components of the vehicle 102 and/or the trailer 104. In certain embodiments, the sensor array 122 includes battery sensors 126 that measure a state of charge of the battery 112 of the vehicle 102 as well as a battery 152 of the trailer 104. In certain embodiments, one or more such battery sensors 126 may be disposed onboard the vehicle 102 (e.g., for measuring data pertaining to the vehicle battery 112), while one or more other such battery sensors 126 may be disposed onboard the trailer 104 (e.g., for measuring data pertaining to the trailer battery 152). In addition, in certain embodiments, the sensor array 122 also includes one or more braking sensors (or "brake sensors") 128 for measuring data pertaining to the braking system 156 of the trailer 104. In certain embodiments, one or more such braking sensors 128 may be disposed on the trailer 104.

In various embodiments, the one or more transceivers 124 may facilitate communications between the vehicle 102 and the trailer 104, such as instructions for braking and control of current between the vehicle 102 and the trailer 104 (and the respective batteries 112, 152 thereof). In certain embodiments, respective transceivers 124 may be disposed on the vehicle 102 and the trailer 104 and be in communicative contact with one another. In various embodiments, the transceiver 124 may comprise any number of receivers, transmitters, and/or transceivers.

In various embodiments, the controller 130 is coupled to the sensor array 122 and the transceivers 124. Also in various embodiments, the controller 130 may further be coupled to the vehicle battery 112, the trailer battery 152, the braking system 156, the other trailer components 158, and/or one or more other components of the vehicle 102, the trailer 104, and/or the smart switch 106.

In various embodiments, the controller 130 controls braking for the braking system 156 of the trailer 104. In addition, in various embodiments, the controller 130 controls the flow and usage of current between the vehicle 102 and the trailer 104, including between the respective batteries 112, 152. In various embodiments, the controller 130 performs these and other functions in accordance with the steps of the process 200 described further below in connection with FIG. 2.

As depicted in FIG. 1, the controller 130 comprises a computer system. In certain embodiments, the controller 130 may also include one or more of the sensor array 122, transceiver 124, the smart switch 106, one or more other devices and/or systems, and/or components thereof. In addition, it will be appreciated that the controller 130 may otherwise differ from the embodiment depicted in FIG. 1. For example, the controller 130 may be coupled to or may otherwise utilize one or more remote computer systems and/or other control systems, and/or one or more other systems of the vehicle 102 and/or the trailer 104.

In the depicted embodiment, the computer system of the controller 130 includes a processor 132, a memory 134, an interface 136, a storage device 138, and a bus 137. The processor 132 performs the computation and control functions of the controller 130, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 139 contained within the memory 134 and, as such, controls the general operation of the controller 130 and the computer system of the controller 130, generally in executing the processes described herein, such as the process 200 described further below in connection with FIG. 2.

The memory 134 can be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 139 along with one or more stored values 140 (e.g., one or more predetermined thresholds used in connection with the process 200 of FIG. 2).

The bus 137 serves to transmit programs, data, status and other information or signals between the various components of the computer system of the controller 130. The interface 136 allows communication to the computer system of the controller 130, for example from a system driver and/or another computer system, and can be implemented using any suitable method and apparatus. In one embodiment, the interface 136 obtains the various data from the sensors of the sensor array 122. The interface 136 can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including direct access storage devices such as hard disk drives, flash systems, floppy disk drives and optical disk drives. In one exemplary embodiment, the storage device 138 comprises a program product from which memory 134 can receive a program 139 that executes one or more embodiments of one or more processes of the present disclosure, such as the steps of the process 200 (and any sub-processes thereof) described further below in connection with FIG. 2. In another exemplary embodiment, the program product may be directly stored in and/or otherwise accessed by the memory 134 and/or a disk (e.g., disk 142), such as that referenced below.

The bus 137 can be any suitable physical or logical means of connecting computer systems and components. This includes, but is not limited to, direct hard-wired connections, fiber optics, infrared and wireless bus technologies. During operation, the program 139 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 130 may also otherwise differ from the embodiment depicted in FIG. 1, for example in that the computer system of the controller 130 may be coupled to or may otherwise utilize one or more remote computer systems and/or other control systems.

While the components of the control system 120 (including the sensor array 122, the transceiver 124, and the controller 130) are depicted as being part of the same system, it will be appreciated that in certain embodiments these features may comprise two or more systems. In addition, in various embodiments the control system 120 may comprise all or part of, and/or may be coupled to, various other devices and systems, such as, among others, the vehicle 102, the trailer 104, the smart switch 106, and/or one or more components and/or systems thereof.

Also as noted above, the smart switch 106 and the connectors 107 physically connects the vehicle 102 with the trailer 104. In various embodiments, both the vehicle 102 and the trailer 104 have respective connectors 107 (e.g., including various wires) for coupling the vehicle 102 and the trailer 104 together.

In various embodiments, the smart switch 106 comprises one or more processors, such as the processor 132 and/or one or more other processors coupled thereto. Also in certain embodiments, the smart switch 106 is coupled to the control system 120 and at least facilitates functions and steps performed thereby. In certain other embodiments, the control system 120, and/or one or more components thereof, are disposed within and/or as part of the smart switch 106.

FIG. 2 is a flowchart of a process for controlling current flow between a vehicle and a trailer, in accordance with exemplary embodiment. In various embodiments, the process 200 may be implemented in connection with the vehicle 102, the trailer 104, the smart switch 106, and the control system 120 thereof.

As depicted in FIG. 2, in one embodiment, the process 200 begins at step 202. In one embodiment, the process 200 begins when a driver is disposed or occupant within a vehicle, for example when the driver and/or occupant is seated in the vehicle and/or ready to operate and/or utilize the vehicle.

In various embodiments, at step 204, a state of charge of the vehicle battery 112 is measured. In various embodiments, the state of charge of the vehicle battery 112 is measured by one or more of the battery sensors 126 of FIG. 1.

Also in various embodiments, at step 206, a state of charge of the trailer battery 152 is measured. In various embodiments, the state of charge of the trailer battery 152 is also measured by one or more of the battery sensors 126 of FIG. 1.

In various embodiments, a determination is made at step 208 as to an amount of available current. In various embodiments, this determination is made by the processor 132 of FIG. 1 based on an amount of current that is available from the vehicle battery 112 to be provided to the trailer 104, for example for use in charging the trailer battery 152 and/or for powering the braking system 156 and/or other components 158 of the trailer 104, as determined by the vehicle battery 112 state of charge of step 206. In certain embodiments, the amount of current available from the vehicle battery is assumed to be limited by a thirty (30) amp fuse on the vehicle.

In various embodiments, a determination is made at step 210 as to whether the state of charge of the trailer battery 152 is less than a predetermined threshold. In various embodiments, this determination is made by the processor 132 of FIG. 1 as to whether the trailer battery 152 state of charge from step 204 is less than a predetermined threshold that is stored in the memory 134 of FIG. 1 as one of the stored values 140 thereof. In certain embodiments, the predetermined threshold is a calibratable value. Also in certain embodiments, the predetermined threshold is determined in testing for the specific system. In various embodiments, the predetermined threshold is set by determining the trailer battery state of charge below, and in which better performance may be attained by drawing power from the vehicle battery which may be limited to thirty (30) amps.

If it is determined at step 210 that the state of charge of the trailer battery 152 is less than the predetermined threshold, then the process proceeds to step 212. During step 212, a determination is made as to whether the vehicle 102 and trailer 104 are experiencing a braking event. In various embodiments, this determination is made by the processor 132 based on sensor data obtained from one or more braking sensors 128 of FIG. 1.

If it is determined in step 212 that there is no braking event, then the process proceeds to step 214. During step 214, braking is not applied. In addition, also during step 214, the trailer battery 152 is charged via the vehicle battery 112 and/or via a charging system of the vehicle 102 (e.g., an alternator when the vehicle 102 is running). In certain embodiments, the trailer battery 152 charging occurs based only on an additional condition that there is sufficient available current from the vehicle battery 112, as determined in step 208. In various embodiments, following step 214, the process then proceeds to step 238, described further below.

Conversely, if it is determined in step 212 that there is a braking event, then the process proceeds instead to step 216. During step 216, braking is applied by the braking system 156 of the trailer 104. Also in various embodiments, the braking is provided via current provided by the trailer battery 152, based on instructions provided by the processor 132. In various embodiments, the process then proceeds to step 218, described below.

During step 218, in various embodiments, the vehicle battery 112 is isolated from the trailer battery 152 and the other trailer components 158 of FIG. 1. Specifically, in various embodiments, while the trailer battery 152 is providing current to power the braking provided by the braking system 156 of the trailer 104, the vehicle battery 112 and the trailer battery 152 are isolated from one another so that the trailer battery 152 and the other trailer components 158 do not receive current from the vehicle battery 112. In various embodiments, this is accomplished via instructions provided by the processor 132 using the smart switch 106 of FIG. 1, so that not too much current is taken from the vehicle battery 112 at the same time (e.g., to avoid excessive discharge of the vehicle battery 112, and to avoid having a fuse blown in connection with the smart switch 106 and/or connectors 107). In various embodiments, the process then proceeds to step 238, described further below.

With reference back to step 210, if it is instead determined at step 210 that the state of charge of the trailer battery 152 is greater than or equal to the predetermined threshold, then the process proceeds instead to step 220. During step 220, a determination is made as to whether the vehicle 102 and trailer 104 are experiencing a braking event, similar to step 212 above. In various embodiments, this determination is similarly made by the processor 132 based on sensor data obtained from one or more braking sensors 128 of FIG. 1.

If it is determined in step 220 that there is a braking event, then the process proceeds to step 222. During step 222, braking is applied by the braking system 156 of the trailer 104. Also in various embodiments, the braking is provided via current provided by the vehicle battery 112 (or a charging system of the vehicle 102), rather than by the trailer battery 152, based on instructions provided by the processor 132. In various embodiments, the process then proceeds to step 224, described below.

During step 224, the braking system 156 of the trailer 104 is controlled, and operates, in a degraded mode. In various embodiments, determinations are made as to the amount of current that is currently available from the trailer battery 152 from step 204 above, and the functionality of the braking system 156 is provided in a manner that most effectively provides braking given the limited amount of current available, via a current rationing technique. In various embodiments, this rationing of current is utilized by the braking system 156 in response to a status report that is provided by the smart switch 106 to the braking system 156 as to the amount of current that is available for use by the braking system 156, for example via instructions provided by the processor 132.

Also in certain embodiments, during step 226, the status of the degraded mode may also be provided to a user or occupant of the vehicle 102 and/or trailer 104. For example, in certain embodiments, the status may be provided via an audio display, a visual display, a haptic display, a message sent to a smart phone or other device, and so on.

Also in certain embodiments, during step 228, the trailer battery 152 is not charged by the vehicle battery 112. Moreover, also during step 228, in various embodiments, the other systems 158 of the trailer 104 are also controlled in a degraded mode with limited power. In various embodiments, the other vehicle systems 158 only used limited current, if at all, for essential functions, given the rationing of the electric current (along with the rationing of the electric current by the braking system 156). In various embodiments, this rationing of current is performed by the other systems 158 in response to a status report that is provided by the smart switch 106 to the other systems 158 as to the amount of current that is available for use by the other systems 158, for example via instructions provided by the processor 132. In various embodiments, following step 228, the process then proceeds to step 238, described further below.

With reference back to step 220, if it is instead determined in step 220 that there is no braking event, then the process proceeds instead to step 230. During step 230, braking is not applied. Instead, the trailer battery 152 is charged by the vehicle battery 112. In various embodiments, this is performed via instructions provided by the processor 132. In various embodiments, the process then proceeds to step 232, described below.

During step 232, the braking system 156 of the trailer 104 operates in a degraded mode (similar to the discussion above with respect to step 224), in the event braking is needed.

Also in certain embodiments, during step 234, the status of the degraded mode may also be provided to a user or occupant of the vehicle 102 and/or trailer 104. For example, in certain embodiments, the status may be provided via an audio display, a visual display, a haptic display, a message sent to a smart phone or other device, and so on.

Also in certain embodiments, during step 236, the other systems 158 of the trailer 104 are also controlled in a degraded mode with limited power. In various embodiments, the other vehicle systems 158 only used limited current, if at all, for essential functions, given the rationing of the electric current. In various embodiments, this rationing of current is performed by the other systems 158 in response to a status report that is provided by the smart switch 106 to the other systems 158 as to the amount of current that is available for use by the other systems 158, for example via instructions provided by the processor 132. In various embodiments, following step 236, the process then proceeds to step 238, described below.

In various embodiments, during step 238, a determination is made as to whether the process is to continue. For example, in certain embodiments, a determination is made as to whether the vehicle 102 and trailer 104 are to continue in operation, such as in a current vehicle drive. In various embodiments, this determination is made by the processor 132 of FIG. 1.

In various embodiments, if it is determined at step 238 that the process is to continue, then the process returns to step 204. Conversely, in various embodiments, if it is instead determined at step 238 that the process is not to continue, then the process instead terminates at step 240.

Accordingly, in various embodiments, the process 200 provides that braking current is provided from the trailer battery 152 to the trailer braking system 156 for braking of the trailer 104 as long as the trailer battery 152 state of charge is above the threshold. Also in various embodiments, when the trailer battery 152 state of charge is above the threshold, the vehicle battery 112 is isolated from the trailer 104 during a braking event to avoid excessive current draw from the vehicle 102 based on combined current draw from trailer braking and charging the trailer battery 152. Also in certain embodiments, when the system is not in a braking event, the vehicle battery 112 will charge the trailer battery 152. Moreover, in certain embodiments, when the trailer battery 152 state of charge is below the threshold, then the system enters a degraded mode, in which braking current is drawing from the vehicle battery 112 of the tow vehicle 102. Also in various embodiments, while in the degraded mode, the braking current is limited based on the fuse on the vehicle battery 112, which for example may be thirty (30) amps in certain embodiments. Moreover, also in various embodiments, while in the low trailer battery 152 degraded mode, the trailer battery 152 is still charged by the vehicle 102 (e.g., via the vehicle battery 112 and/or charging system of the vehicle 102) when a braking event is not occurring.

Accordingly, methods and systems are provided for controlling current between a vehicle and a trailer. In various embodiments, current is controlled between the vehicle and the trailer based on the state of charge of both the vehicle battery and the trailer battery, for example to provide trailer braking and recharging the trailer battery while helping to limit the amount of current transfer when necessary, for example to avoid a blown fuse or other issue between the vehicle and the trailer.

It will be appreciated that the disclosed methods and systems may vary from those depicted in the Figures and described herein. For example, the system 100, the vehicle 102, the trailer 104, the smart switch 106, and the control system 120, and/or various components thereof, from that depicted in FIG. 1 and described in connection therewith. In addition, it will be appreciated that certain steps of the process 200 may vary from those depicted in FIG. 2 and/or described above in connection therewith. It will similarly be appreciated that certain steps of the methods described above may occur simultaneously or in a different order than that depicted in FIG. 2 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method for controlling automatic current from a tow vehicle to a trailer coupled thereto, the tow vehicle having a vehicle battery and the trailer having a trailer battery, the method comprising:
   measuring, via a sensor, a state of charge of the trailer battery;
   determining whether a braking event is occurring;
   determining whether the state of charge of the trailer battery is less than a predetermined threshold; and selectively providing current from the tow vehicle to the trailer based on the state of charge of the trailer battery, in accordance with instructions provided by a processor,
wherein the step of selectively providing current comprises selectively providing current from the tow vehicle to the trailer to control braking, based on whether the braking event is occurring and the state of charge of the trailer is less than the predetermined threshold, and wherein the method further comprises:
providing current from the vehicle battery to a braking system of the trailer to perform braking for the trailer, when the braking event is occurring and the state of charge of the trailer battery is less than the predetermined threshold; and
providing current from the trailer battery, instead of the vehicle, to the braking system of the trailer to perform braking for the trailer, when the braking event is occurring and the state of charge of the trailer battery is greater than the predetermined threshold.

2. The method of claim 1, further comprising:
measuring, via a second sensor, a state of charge of the vehicle battery;
wherein the step of selectively providing current comprises selectively providing current from the tow vehicle to the trailer based on both the state of charge of the trailer battery and the state of charge of the vehicle battery, in accordance with the instructions provided by the processor.

3. The method of claim 1, wherein the step of selectively providing current further comprises:
providing current from the vehicle battery to charge the trailer battery, when the braking event is not occurring; and
isolating the vehicle battery from the trailer battery, so that the vehicle battery in not charging the trailer battery, when the braking event is occurring.

4. The method of claim 1, wherein the step of selectively providing current further comprises:
operating a braking system of the trailer in a degraded mode, with limited current, when the state of charge of the trailer battery is less than the predetermined threshold.

5. The method of claim 4, wherein the step of selectively providing current further comprises:
operating one or more additional system of the trailer, in addition to the braking system of the trailer in a degraded mode, with limited current, when the state of charge of the trailer battery is less than the predetermined threshold.

6. A system for controlling automatic current from a tow vehicle to a trailer coupled thereto, the tow vehicle having a vehicle battery and the trailer having a trailer battery, the system comprising:
a sensor configured to at least facilitate measuring a state of charge of the trailer battery; and
a processor coupled to the sensor and configured to at least facilitate selectively providing current from the tow vehicle to the trailer based on the state of charge of the trailer battery, wherein the processor is further configured to at least facilitate:
determining whether a braking event is occurring;
determining whether the state of charge of the trailer battery is less than a predetermined threshold;
selectively providing current from the tow vehicle to the trailer to control braking, based on whether the braking event is occurring and the state of charge of the trailer is less than the predetermined threshold;
operating a braking system of the trailer in a degraded mode, with limited current, when the state of charge of the trailer battery is less than the predetermined threshold; and
operating one or more additional system of the trailer, in addition to the braking system of the trailer in a degraded mode, with limited current, when the state of charge of the trailer battery is less than the predetermined threshold.

7. The system of claim 6, further comprising:
a second sensor configured to at least facilitate measuring a state of charge of the vehicle battery;
wherein the processor is configured to at least facilitate selectively providing current from the tow vehicle to the trailer based on both the state of charge of the trailer battery and the state of charge of the vehicle battery.

8. The system of claim 6, wherein the processor is configured to at least facilitate:
providing current from the vehicle battery to a braking system of the trailer to perform braking for the trailer, when the braking event is occurring and the state of charge of the trailer battery is less than the predetermined threshold; and
providing current from the trailer battery, instead of the vehicle, to the braking system of the trailer to perform braking for the trailer, when the braking event is occurring and the state of charge of the trailer battery is greater than the predetermined threshold.

9. The system of claim 6, wherein the processor is configured to at least facilitate:
providing current from the vehicle battery to charge the trailer battery, when the braking event is not occurring; and
isolating the vehicle battery from the trailer battery, so that the vehicle battery is not charging the trailer battery, when the braking event is occurring.

10. An automotive system comprising:
a tow vehicle having a vehicle battery;
a trailer coupled to the tow vehicle, the trailer having a trailer battery; and
a control system comprising:
a sensor configured to at least facilitate measuring a state of charge of the trailer battery; and
a processor coupled to the sensor and configured to at least facilitate selectively providing current from the tow vehicle to the trailer based on the state of charge of the trailer battery; wherein the processor is further configured to at least facilitate:
determining whether a braking event is occurring;
determining whether the state of charge of the trailer battery is less than a predetermined threshold;
selectively providing current from the tow vehicle to the trailer to control braking, based on whether the braking event is occurring and the state of charge of the trailer is less than the predetermined threshold;
providing current from the vehicle battery to a braking system of the trailer to perform braking for the trailer, when the braking event is occurring and the state of charge of the trailer battery is less than the predetermined threshold; and
providing current from the trailer battery, instead of the vehicle, to the braking system of the trailer to perform braking for the trailer, when the braking event is occurring and the state of charge of the trailer battery is greater than the predetermined threshold.

11. The automotive system of claim 10, further comprising:
- a second sensor configured to at least facilitate measuring a state of charge of the vehicle battery;
- wherein the processor is configured to at least facilitate selectively providing current from the tow vehicle to the trailer based on both the state of charge of the trailer battery and the state of charge of the vehicle battery.

12. The automotive system of claim 10, wherein the processor is configured to at least facilitate:
- providing current from the vehicle battery to charge the trailer battery, when the braking event is not occurring; and
- isolating the vehicle battery from the trailer battery, so that the vehicle battery is not charging the trailer battery, when the braking event is occurring.

13. The automotive system of claim 10, wherein the processor is configured to at least facilitate:
- operating a braking system of the trailer in a degraded mode, with limited current, when the state of charge of the trailer battery is less than the predetermined threshold; and
- operating one or more additional system of the trailer, in addition to the braking system of the trailer in a degraded mode, with limited current, when the state of charge of the trailer battery is less than the predetermined threshold.

* * * * *